2,760,996
Patented Aug. 28, 1956

United States Patent Office

2,760,996

RECOVERY OF DEWAXING AID FROM SLACK WAXES

Albert N. De Vault, Bartlesville, Okla., assignor to Phillips Petroleum Company, a corporation of Delaware No Drawing. Application September 8, 1952, Serial No. 308,515

7 Claims. (Cl. 260—649)

This invention relates to the recovery of a dewaxing aid from plant waxes. In one of its aspects the invention relates to recovery of a dewaxing aid from a slack wax in a manner such that the dewaxing aid is recovered as a separate phase substantially free from both oil, contained in the slack wax, and the wax itself. In another of its aspects, the invention relates to a more complete recovery of the wax components of slack wax. In a further aspect, the invention relates to the recovery of a dewaxing aid from a slack wax by precipitation, as more fully set out and described below. In a still further aspect, the invention relates to the separation of low melting or microcrystalline or difficultly crystallizable waxes from slack wax and from the crystallization regulator in order that said regulators can be returned for further use in the process without returning to the process, that is, to the initial dewaxing step, any appreciable quantity of the difficultly crystallizable waxes which otherwise tend to build up in a system to act adversely to the crystallization regulator.

In a conventional process for separating wax from oils, the oil is dissolved in a solvent such as propane or a mixture of solvents at an elevated temperature and then the solution is chilled to a sufficiently low temperature to effect precipitation of the wax which is subsequently removed by filtration, settling or centrifuging. A small proportion of a wax separation aid or crystallization regulator is mixed with the oil prior to the admixture with the solvent. This wax separation aid is precipitated along with the wax.

Following the separation of the wax from the oil, the wax is subjected to a deoiling operation. Thus, it is known to employ a deoiling solvent under conditions which will dissolve not only all of the oil contained in the wax but also low melting waxes and the crystallization regulator, which can be, for example, a well-known condensation product of chlorinated paraffin wax with naphthalene or other aromatic compound. According to the known process, the mixture of deoiling solvent, low melting, or difficultly crystallizable wax and the crystallization regulator is treated to remove the solvent therefrom and the remainder of the mixture is returned to the dewaxing step. It is highly desirable to recover separately the dewaxing aid or crystallization regulator, so that it may be reused in the wax-precipitation step without the disadvantage of having to also return the difficultly crystallizable wax to this step.

I have discovered that the wax separation aid can be recovered from plant waxes by precipitation using isopropyl alcohol. The isopropyl alcohol dissolves the oil and wax at readily determined elevated temperatures leaving as a bottom phase substantially pure dewaxing aid. Normal-propyl alcohol, butyl and/or amyl alcohols may also be used to dissolve the oil and wax at said elevated temperatures and leave as a bottom phase the dewaxing aid. Countercurrent extraction may be used to effect the separation of the dewaxing aid from the oil and wax using the alcohol merely as a solvent. Ethyl alcohol may be used in combination with the higher alcohols to control wax solubility, as in counter-current extraction.

Therefore, according to the present invention, there is provided a process for recovering a wax crystallization regulator from a slack wax, obtained upon dewaxing a wax-containing oil employing said regulator, which comprises contacting said slack wax with an alcohol at an elevated temperature. Preferably the slack wax and alcohol mixture are heated to a temperature at which substantially complete solution is accomplished and then cooled until a desired recovery, as a separate phase, formed by precipitation from the solution, of the regulator has been obtained. The alcohol phase, usually the upper phase, is then removed by decantation, filtration, or other means.

As stated, the temperature to which the mixture is to be heated should be sufficiently high to ensure solution of the oil and wax in the alcohol solvent. This temperature will vary somewhat with different slack waxes and regulators. Usually the temperature will be in the range of from about 100° F. to about 250° F. It should be understood also that the temperature at which the solution of the slack wax will occur will depend upon the proportion of alcohol to slack wax employed. For ease of operation and efficient separation, a proportion of alcohol, which of course can be readily recovered, sufficient to dissolve the slack wax at a temperature near the lower end of the recited temperature range is now preferred. A pressure sufficient to ensure liquid phase solvent at the process temperature is also employed.

*Example*

A 39.0 g. sample of SAE 20 slack wax was dissolved in 150 g. of isopropyl alcohol at 160° F. Upon cooling the solution to 154° F. the alcohol phase (upper) was decanted from the lower phase containing the filter aid. The bottoms phase weighed 0.7 g. and analyzed by pour test as 60 per cent "Paraflow" filter aid. (A well-known condensation product of chlorinated paraffin wax with naphthalene or other aromatic compound.) The dewaxing aid recovered from the slack wax amounted to 1.07 per cent.

The sample of slack wax originally contained 1.6 per cent filter aid. Therefore, recovery of 67 per cent of the filter aid was obtained.

As noted, the crystallization regulator can be a condensation product of a chlorinated paraffin wax and an aromatic, for example, naphthalene. Other crystallization regulators can be substituted by one skilled in the art and are, therefore, within the scope of the appended claims.

Variation and modification are possible within the scope of the foregoing disclosure and the appended claims to the invention, the essence of which is that dewaxing aid or crystallization regulator can be recovered separately from slack waxes by heating said waxes with an alcohol, preferably isopropyl alcohol, to complete solution and then cooling the mass thus obtained until precipitation of the regulator, for example, a condensation product of a chlorinated wax and naphthalene, one such being known in the art as "Paraflow," occurs and then decanting the remainder of the mass from said dewaxing aid or crystallization regulator.

I claim:

1. The recovery of a crystallization regulator comprising essentially a chlorinated paraffin wax condensed with an aromatic hydrocarbon compound from slack wax in which it is contained which comprises heating said slack wax with isopropyl alcohol to a temperature in the range 100 to 250° F., cooling the solution thus obtained until precipitation as a separate phase of the said regulator has been obtained and then decanting the remainder of the solution from said phase.

2. A recovery according to claim 1 in which the crystallization regulator is a condensation product of chlorinated paraffin wax with naphthalene, the temperature is about 160° F. and the alcohol is employed in a proportion sufficient to insure complete solution at said temperature.

3. The recovery of a crystallization regulator consisting essentially of a chlorinated paraffin wax condensed with an aromatic hydrocarbon compound from slack wax in which it is contained which comprises heating said wax with isopropyl alcohol to a temperature sufficient to effect complete solution of said slack wax in said alcohol, then cooling the solution thus obtained until there is obtained a phase separation, the lower phase containing the said crystallization regulator, and then decanting the upper phase from said lower phase.

4. The recovery of a crystallization regulator consisting essentially of a chlorinated paraffin wax condensed with naphthalene from a slack wax in which it is contained which comprises heating said slack wax together with isopropyl alcohol at an elevated temperature and under a pressure sufficient to maintain said alcohol in substantially a liquid phase until complete solution of said slack wax in said alcohol has been obtained, then gradually cooling the solution thus obtained until there is obtained as a separate phase separation of the said crystallization regulator and then decanting the remainder of the solution from the said phase and recovering said crystallization regulator for reuse in the production of further quantities of slack wax.

5. The recovery of a crystallization regulator consisting essentially of a chlorinated paraffin wax condensed with an aromatic hydrocarbon compound from a slack wax in which it is contained which comprises heating said wax with an alcohol selected from the group consisting of isopropyl alcohol, normal propyl alcohol, butyl alcohols and amyl alcohols to a temperature sufficient to effect complete solution of said slack wax in said alcohol, then cooling the solution thus obtained until there is obtained a phase separation, the lower phase containing the said crystallization regulator, and then decanting the upper phase from said lower phase.

6. The recovery of a crystallization regulator consisting essentially of a chlorinated paraffin wax condensed with naphthalene from a slack wax in which it is contained which comprises heating said wax with an alcohol selected from the group consisting of isopropyl alcohol, normal propyl alcohol, butyl alcohols and amyl alcohols to a temperature sufficient to effect complete solution of said slack wax in said alcohol, then cooling the solution thus obtained until there is obtained a phase separation, the lower phase containing the said crystallization regulator, and then decanting the upper phase from said lower phase.

7. A recovery according to claim 4 wherein ethyl alcohol is employed as a wax solubility controller to control wax solubility.

References Cited in the file of this patent

UNITED STATES PATENTS

| | | |
|---|---|---|
| 1,963,918 | MacLaren | June 19, 1934 |
| 2,034,175 | Chase et al. | Mar. 17, 1936 |